United States Patent

[11] 3,603,210

[72] Inventor Peter Florjancic
 St. Martin-Strasse 12, Garmisch-
 Partenkirchen, Germany
[21] Appl. No. 761,768
[22] Filed Sept. 23, 1968
[45] Patented Sept. 7, 1971
[32] Priority Sept. 25, 1967
[33] Germany
[31] P 15 83 629.0

[54] HYDRAULIC APPARATUS, PREFERABLY CLOSING APPARATUS FOR INJECTION MOLDING MACHINES
7 Claims, 3 Drawing Figs.

[52] U.S. Cl. .................................................. 91/404,
 91/416, 91/422, 18/30
[51] Int. Cl. ..................................................... F15b 15/17,
 F15b 13/04
[50] Field of Search ............................................. 91/416,
 404, 407; 18/30 LV

[56] References Cited
 UNITED STATES PATENTS
2,805,447 9/1957 Voges ........................... 91/404
3,010,432 11/1961 Robra et al. .................. 91/417

Primary Examiner—Paul E. Maslousky
Attorney—Fleit, Gipple & Jacobson

ABSTRACT: A hydraulic apparatus is provided for moving a member under the action of a small force and for subsequently urging the member against a stop under the action of a large force. The operations are carried out with the aid of pumps and hydraulic pistons which are mechanically connected to the member. The apparatus may be used, e.g., in injection molding machines or blowing machines. A double-acting, working and compensating piston is connected to the member to be moved, e.g., to the movable mold-mounting plate. The pressure chambers disposed in the cylinder at both ends of the piston are hydraulically connected to each other by an opening in the piston. The compensating pressure chamber communicates through an outlet with a chamber which is under a pressure that is lower than the working pressure. The outlet is preferably adapted to be closed. A valve member is provided for the opening in the piston. The piston is provided with sealing means in its opening sleeve, which under the hydraulic working pressure cooperates with the valve member to provide a seal between the working and compensating chambers as soon as the compensating chamber is pressure relieved through the outlet. The valve member is adjustable in the stroke direction.

3,603,210

HYDRAULIC APPARATUS, PREFERABLY CLOSING APPARATUS FOR INJECTION MOLDING MACHINES

A prior disclosure of the applicant relates to a hydraulic apparatus for moving a member under the action of a small force and for subsequently urging said member against a stop under the action of a large force, which operations are carried out with the aid of pumps and of hydraulic pistons that are mechanically connected to said member. Said apparatus is characterized in that a working piston and a compensating piston, which is smaller in cross section, are mechanically connected to each other and to the member to be moved, the associated cylinders are hydraulically connected to each other by an opening which can be closed, the cylinder which contains the compensating piston is connected by an outlet to a chamber which is maintained below the working pressure, and said outlet is preferably adapted to be closed. In a further development of the invention according to said prior disclosure, the working piston and compensating piston are formed by a single piston, which is double acting and has a smaller cross section at one end owing to the elements which connect the piston to the member which is to be moved. The opening which is adapted to be closed is desirably provided in the piston between the two cylinders. Finally, the prior disclosure states that the valve member for closing the opening between the two cylinders is operatively connected to the member which is to be moved. The hydraulic apparatus according to the prior disclosure affords the advantage that a single pump, which is not variable, may be used to effect a fast closing movement and to produce a high closing pressure whereas a low oil flow rate is sufficient in the conduit which connects the pump to the cylinder.

Said prior disclosure is contained in U.S. Pat. application Ser. No. 701,168 filed Jan. 29, 1968.

The present invention relates to a further development and improvement of the hydraulic apparatus according to said prior disclosure and has the object that the opening which connects the two pressure chambers of the cylinder should be hydraulically effected rather than mechanically and the working pressure of the hydraulic fluid should be used for this purpose.

In a hydraulic apparatus for moving a member under the action of a small force and for subsequently urging said member against a stop under the action of a large force, which operations are carried out with the aid of pumps and hydraulic pistons which are connected to said member, preferably in closing apparatus for presses, such as injection molding machines, or for blowing machines, in which a double-acting working and compensating piston is connected to the member to be moved, e.g., to the movable mold-mounting plate, the pressure chambers disposed in the cylinder at both ends of the piston are hydraulically connected to each other by an opening in the piston, the compensating pressure chamber communicates through an outlet with a chamber which is under a pressure that is lower than the working pressure. The outlet is preferably adapted to be closed, and a valve member is provided for the opening in the piston, the above-mentioned object is accomplished in accordance with the invention in that the piston is provided in its opening with a longitudinally slidable valve sleeve, which under the hydraulic working pressure cooperates with the valve member to provide a seal between a working and compensating chambers as soon as the compensating chamber is pressure relieved through the outlet, and the valve member is adjustable in the stroke direction. The apparatus according to the invention affords the advantage that there is no need for a mechanical linkage for reciprocating the valve member and that the sealing action is improved by the hydraulic working pressure.

The Invention may be desirably carried out in that the valve sleeve consists of a sealing ring, which is urged by a spring in the closing direction against a stop in the opening of the piston, and the valve member is disposed in the end of the cylinder and has a conical sealing surface. This design affords the advantage that the entire hydraulic working pressure is caused to act on the die by means of the traverselike connecting elements rather than on the valve member so that a power stroke is enabled.

In another desirable embodiment of the invention, the valve sleeve is floatingly held in the piston by collars at both ends and is sealed from the outside, and the valve member consists of a stuffing box, which has a cylindrical sealing surface and is carried by a rod that is mounted in the cylinder cover. This embodiment of the invention has the advantage that it is sufficient to move the valve sleeve rather than the entire working piston in order to effect the seal. Because the valve sleeve quickly slips onto the stuffing box as soon as the compensating chamber is pressure relieved, the seal is effected immediately and the cycle of operations of the machine is shortened in time.

Finally, the invention provides an apparatus in which the valve member consists of two parts, in accordance with the invention, and the stuffing box is mounted on a guide rod so as to be slidable in the stroke direction. This embodiment of the invention enables also a power stroke in the opening direction because the compensating chamber becomes a working chamber to the extent in which the stuffing box is displaceable on the guide rod. This results in the development of a large force, which slowly moves the mold halves apart.

Two embodiments of the invention will be described hereinafter by way of example with reference to the drawing, in which FIG. 1 is a broken-away view showing partly in elevation and partly in section a hydraulic closing apparatus of an injection molding machine in its open position.

Figure 1:
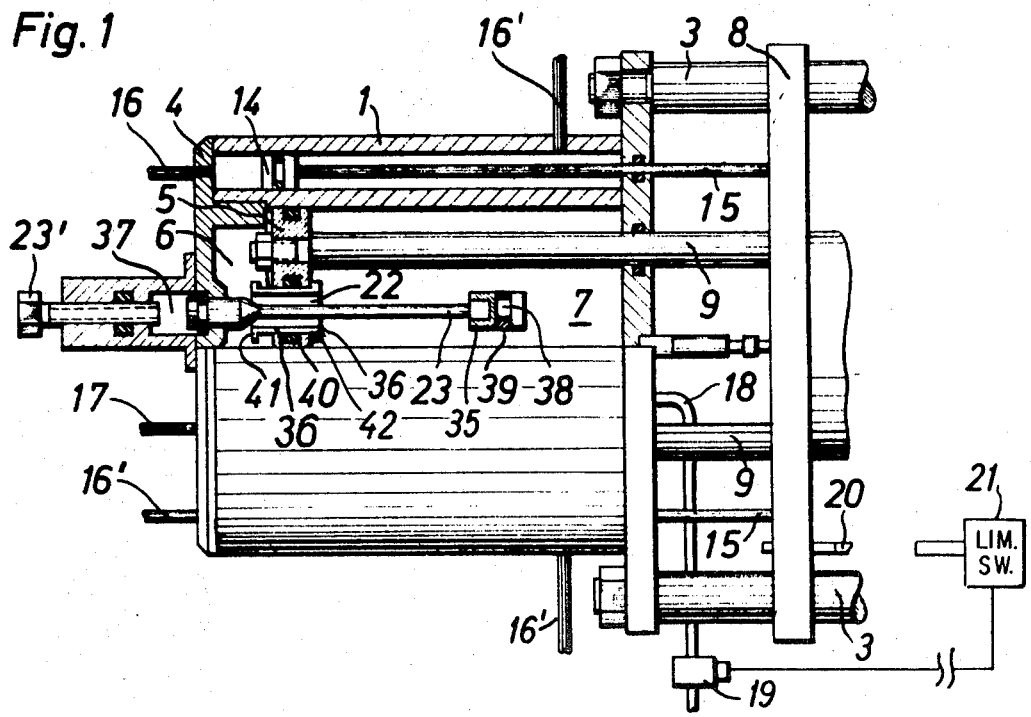

In both embodiments, the cylinder body 1 is connected to the stationary mold-clamping plate, not shown, by studs, 3 and is closed by the cover 4. A double-acting piston 5 divides the interior of the cylinder into a working chamber 6 and a compensating chamber 7. The piston 5 is connected by connecting rods 9 to the movable mold-clamping plate 8.

In addition to the previously mentioned main cylinder, the cylinder body 1 comprises two additional cylinders, which are smaller in cross section and contain returning pistons 14. The latter are rigidly connected to the movable mold-clamping plate 8 by piston rods 15.

These cylinders are connected to a pump system not shown by pipe conduits 16 and 16' and the main cylinder is connected to the pump system by the connection 17. Variable valves, not shown, are connected between respective cylinders and the pump system.

Another connection leads from the compensating chamber 7 through a conduit 18 and a solenoid valve 19 to a nonpressurized reservoir of the pump system.

The solenoid valve is opened by a limit switch 21 which in turn is activated by an adjustable actuating pin 20 mounted on the movable mold-clamping plate as soon as the mold has reached its closed position. The solenoid valve 19 may have a cross section of flow for handling only very low rates of oil.

In both embodiments, the piston 5 has a bore 22, which cooperates with a valve member, which lies in the compensating chamber at least in its open position.

Figure 2:
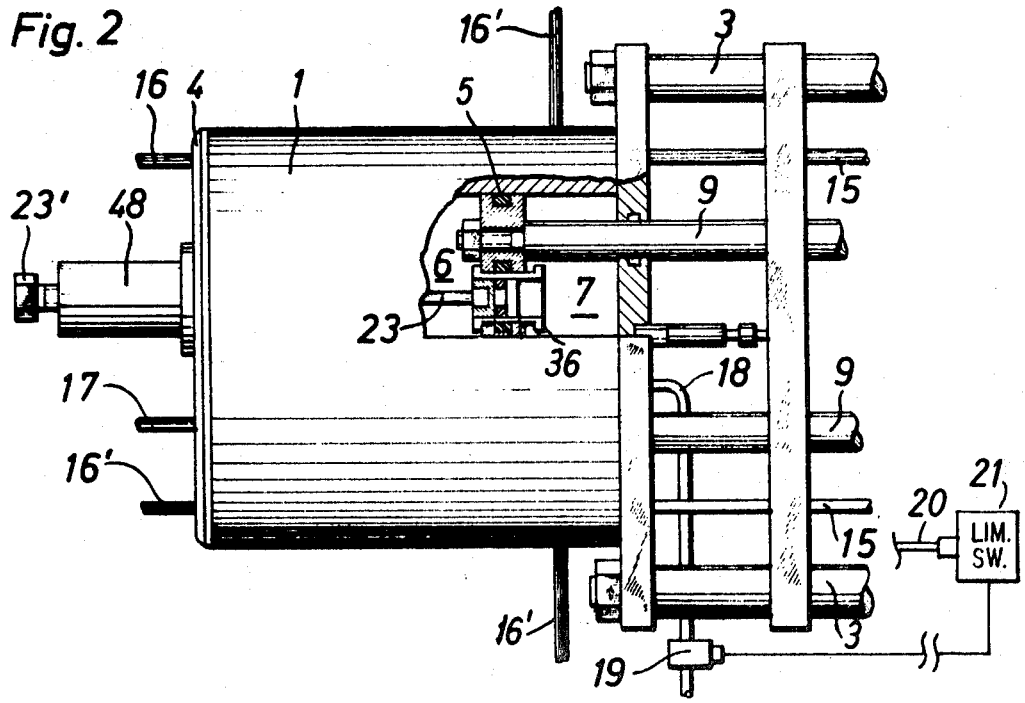
FIG. 2 shows the same apparatus in its closed position.

In the embodiment shown in FIGS. 1 and 2, the valve member consists of a stuffing box 35 having a cylindrical sealing surface and carrying in an annular groove 38 a sealing ring 39 of compressible material. The valve member is disposed at the end of a valve stem 23, which is mounted in the cylinder cover 4. A valve sleeve 36 is floatingly mounted in the piston 5 and sealed from the outside by a sealing ring 40. The movement of the valve sleeve 36 in the stroke direction is limited by collars 41, 42 provided at opposite ends of the sleeve.

The apparatus has the following mode of operation:

When the elements are initially in the position shown in FIG. 1, liquid under pressure is pumped through the connection 17 into the working chamber 6. Owing to the communication provided by the bore 22, the pressure in the compensating chamber 7 is the same as in the working chamber 6. The effective cross section of the piston in the compensating chamber is smaller by the cross section of the connecting rod 9 so that the piston is subjected to a resultant force tending to move it toward its closed position. As a result of the movement of the piston 5, the oil contained in the compensating chamber 7 is displaced through the bore 22 into the working chamber 6 so that an amount of liquid corresponding to the cross section of the connecting rods 9 is sufficient to fill the working chamber 6.

Figure 3:
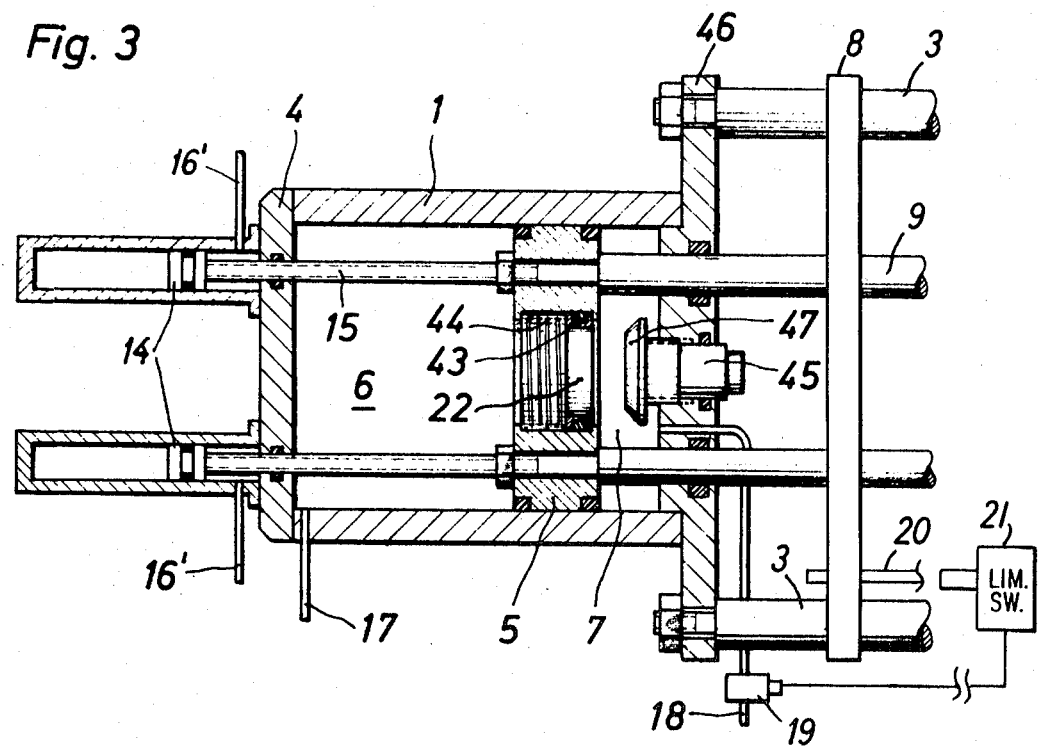
FIG. 3 is a sectional view showing a modified embodiment of the closing apparatus according to the invention in its closed position.

The differential amount of liquid required to fill up the working chamber may be reduced, as is shown in FIG. 3, in that the connecting rods 9 are continued at that end of the piston 5 which faces the working chamber 6 and extend through the cover 4 out of the cylinder body 1. In this case the rods 9 have in that portion thereof which is movable in the working chamber 6 a smaller cross section than in the portion which is movable in the compensating chamber.

During the approach to the position in which the mold is closed, the piston movement is slowed down by the resistance which is developed because the cross section of flow is reduced by the valve sleeve 36 so that the closing of the mold is damped. Initially in this phase, the valve sleeve 36 together with the piston 5 engages the sealing ring 39 of the valve member. Under the working pressure of the hydraulic liquid, the valve sleeve 36, which is slidable in the stroke direction, is displaced relative to the piston 5 at this time and slips over the sealing ring 39 onto the valve member so as to effect a seal on a cylindrical surface. When the mold is closed, the valve is closed too.

At the same time, the pin 20 actuates the limit switch 21 so that the valve 19 is opened to connect the compensating chamber 7 to the supply reservoir. The full no-load pressure of the pump is applied from the working chamber to one end of the piston 5 and the mold is thus held closed under the action of a large force. This position is shown in FIG. 2.

When it is desired to open the mold, the discharge conduit of the pump is disconnected from the connection 17 and connected to the connections 16' so that the liquid under pressure is applied to the return pistons 14. The movable mold-clamping plate 8 is withdrawn from the stationary mold-clamping plate and the valve opens as the piston 5 returns, so that a large part of the liquid contained in the working chamber 6 is transferred into the compensating chamber 7. Only a small part is forced into the reservoir through the connection 17.

As is also apparent from FIG. 1, the valve stem 23 cooperates with an adjusting screw 23' so that the valve member is floatingly mounted. With this arrangement, the molding may be removed from the mold even under very high pressures because a pressure is built up in the compensating chamber 7. By the adjustment of the screw 23' and the resulting change of the space 37 between the adjusting screw 23' and the valve stem 23, the point at which the valve is to be opened during the return stroke can be predetermined because this point depends on the time at which the free end of the valve stem 23 impinges on the adjusting screw 23'.

In the embodiment of the invention shown in FIG. 3, the valve sleeve consists of a sealing ring 43, which is urged by a spring 44 in closing direction against a stop provided in the opening 22 of the piston so that the hydraulic liquid being transferred cannot displace the sealing ring 43 from its closed position. The valve member 45 having a conical sealing surface 47 is disposed in the end 46 of the cylinder body 1 and is also adjustable in the stroke direction by conventional means such as a threaded connection. This embodiment results in a more linear seal.

Apart from the cooperation between the sealing ring 43 and the valve member 45, the mode of operation of this device is the same as that of the embodiment described with reference to FIGS. 1 and 2.

What is claimed is:

1. Hydraulic closure apparatus for molding machines, comprising a cylinder housing having fluid connections for the receipt and discharge of hydraulic fluid and a piston having a continuous connecting opening therethrough mounted in said cylinder housing, said piston being displaceably guided between an initial position and a final position and connected by at least one connecting rod with a part to be moved, said piston dividing the cylinder housing into a working space and a compensation space, and further having end surfaces of different size so that said piston can be acted on by hydraulic fluid on both sides, said hydraulic fluid displacing said piston in the direction towards its end position, where a valve member closes the piston opening at a predetermined place towards its end position, a valve secured to one of said cylinder fluid connections, said valve controlling the passage of the hydraulic fluid through a discharge connection from the cylinder housing, and opened by switching means after the piston opening has been closed, allowing the compensation space to be relieved of pressure while maintaining pressure in the working space, and a longitudinally displaceable packing element cooperating with said valve member when said valve member is arranged in the opening of the piston.

2. Hydraulic apparatus according to claim 1, wherein the packing element is a packing ring which is axially guided in the piston opening and is urged in a direction towards the end position of the piston against a stop by spring means, and the valve member is adjustably mounted in the end of the cylinder housing and has a conical sealing surface which cooperates with said packing ring.

3. Hydraulic apparatus according to claim 1, wherein the packing element is a displaceable sleeve in the piston opening, said sleeve having at its ends collars which extend beyond the ends of the piston, said collars serving as stops and in connection with which the valve member is a stuffing box which is secured to a shaft which extends axially into the cylinder housing and is fastened to same in the vicinity of the starting position of the piston.

4. Hydraulic apparatus according to claim 3, wherein the shaft is displaceable with respect to the cylinder housing between two axial end positions and one of the end positions is adjustable by means of an adjustment screw.

5. Hydraulic apparatus according to claim 3, wherein the stuffing box is displaceably supported on the shaft.

6. Hydraulic apparatus according to claim 1, wherein each said connecting rod connecting the piston with the part to be moved is mounted in sealed relationship to said cylinder housing and displaceably passes through said cylinder housing, and in connection with which in the axial extension of each connecting rod is a piston rod fastened to said piston, said piston rod displaceably passing through the working space and the cylinder housing, said piston rod having one end fastened to said piston and the other end having a return piston mounted thereon which lies outside the cylinder housing in a return cylinder.

7. Hydraulic apparatus according to claim 6, wherein each said piston rod has a smaller diameter than each said connection rod.